Figure 1:
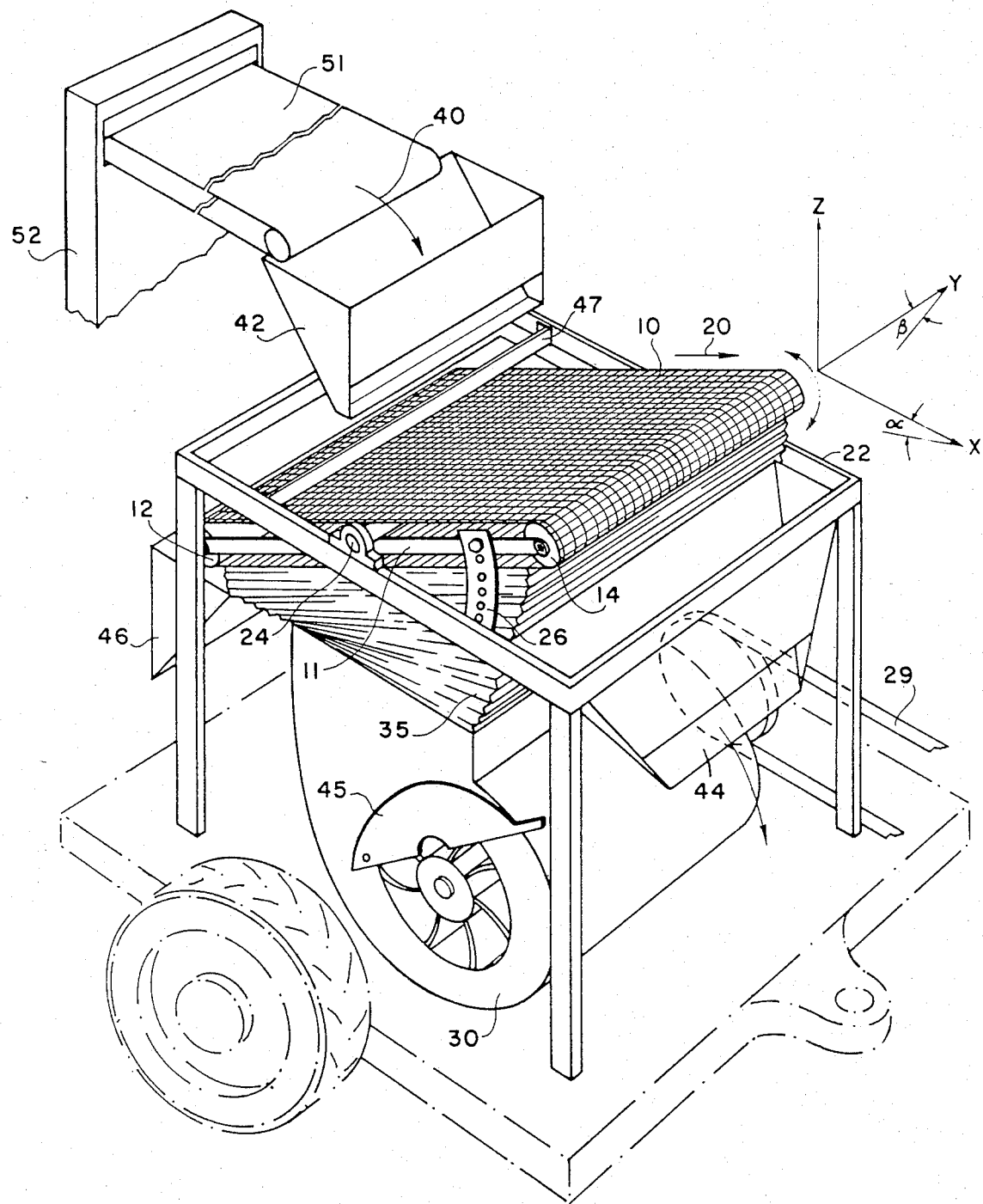

United States Patent [19]

Feller et al.

[11] Patent Number: 4,515,276

[45] Date of Patent: May 7, 1985

[54] SEPARATION DEVICES EMPLOYING FORCED AIR THROUGH CONVEYOR BELT MEANS

[75] Inventors: Ron Feller, Ramat Efal; Amos Mizrach, Holon, both of Israel

[73] Assignee: The State of Israel, Ministry of Agriculture, Jerusalem, Israel

[21] Appl. No.: 515,684

[22] Filed: Jul. 20, 1983

Related U.S. Application Data

[63] Continuation-in-part of Ser. No. 278,392, Jun. 29, 1981, abandoned.

[51] Int. Cl.³ ............................................. B07B 3/08
[52] U.S. Cl. ................................. 209/693; 130/27 Z;
        209/44.2; 209/470; 209/932
[58] Field of Search .............. 209/44.1, 44.2, 691–694,
        209/707, 932, 935, 467, 468, 466, 470, 471, 472,
        469, 502, 644, 136, 137, 138, 139 R, 20, 607;
        130/27 Z; 56/13.3, 12.8

[56] References Cited

U.S. PATENT DOCUMENTS

| | | | |
|---|---|---|---|
| 1,040,663 | 10/1912 | Goodhue | 209/136 |
| 1,939,121 | 12/1933 | Kent et al. | 209/467 |
| 1,949,729 | 3/1934 | Peale et al. | 209/467 |
| 2,404,414 | 7/1946 | Sutton | 209/467 |
| 2,928,545 | 3/1960 | Forsberg | 209/20 |
| 3,886,951 | 6/1975 | McRobert | 209/693 |

FOREIGN PATENT DOCUMENTS

| | | | |
|---|---|---|---|
| 28686 | 12/1931 | Australia | 209/470 |
| 711465 | 9/1931 | France | 209/466 |

Primary Examiner—Robert B. Reeves
Assistant Examiner—Donald T. Hajec
Attorney, Agent, or Firm—Browdy and Neimark

[57] ABSTRACT

A gravity separator device for field use in separating material comprising spurious matter and harvested products employing airflow through a grid-like conveyor belt moving upward while inclined to the horizontal for reducing the friction between the conveyor belt and the lighter material causing the lighter material to move downward into a collecting receptacle while the heavier material is moved upward by the conveyor belt.

17 Claims, 2 Drawing Figures

SEPARATION DEVICES EMPLOYING FORCED AIR THROUGH CONVEYOR BELT MEANS

REFERENCE TO RELATED APPLICATIONS

This is a continuation-in-part of Application Ser. No. 278,392 filed on June 29, 1981, now abandoned.

FIELD OF THE INVENTION

The present invention relates to separation devices generally and particularly to separation devices employing airflow through grid-like conveyor belts.

BACKGROUND OF THE INVENTION

There are known many differing types of apparatus for separating various products including agricultural products from spurious material, i.e. including for example, clods, stones and vegetation.

Conventional airflow separation devices use an air stream directed toward a mixture of products and other material. The lighter products of the mixture are propelled the furthest. Thus generally such devices propel the lighter material upwardly while the heavy products go downwardly. This type of air separator is not suitable for processing a high rate of feed material containing a large percentage of clods.

A particularly efficient type of device commonly known as a "stoner" is basically an uphill vibrating conveyor with a porous surface. When carefully controlled air passes through the porous surface lighter particles are lifted from the conveyor surface and are moved downward by the force of gravity. The heavier particles remain in contact with the vibrating surface and move upward.

Devices of the stoner type are conventionally employed in fixed locations such as in packing or processing plants. They are not suitable for use in the field for on-line processing of harvested goods for a number of reasons.

The "stoner" device is extremely sensitive to the angle of inclination of the porous surface. A slight change in angle has a large effect on the vibrational forces required to drive the products up the slope. For example, if the grid is tilted toward one side, even slightly, the vibrational movement of the surface which effectively lowers the coefficient of friction causes a large percentage of the material to "pile up" on the low side and interfere with the effective operation of the device. Also if the slope of the surface increases slightly the flow of the products up the surface is curtailed. Since the ground surface under field conditions is relatively uneven, the precision maintenance of the slope angle is rendered exceedingly difficult if not impracticable. Thus leveling means can be employed, more power can be used but both alternatives are costly and/or time consuming.

A further difficulty with employing devices of the "stoner" type under field conditions is that the airflow generated under the operating field conditions contains a very large amount of vegetation debris which tends to be forced up against the underside of the grid by the airflow and thus blocks the air passage through the grid. This problem is not encountered in processing plants where the surrounding atmosphere is relatively clean and free of spurious material or alternatively an air supply is provided from a location remote from the operational area.

Also, the fact that devices of the "stoner" type employ vibrating elements makes it preferable that the devices be firmly anchored in a fixed location or costly and complicated counter-balancing equipment is employed. Thus the present "stoners" are unsuitable for incorporation into moving or movable support structures and field use.

The present invention seeks to overcome the deficiencies of prior art apparatus and to provide separation apparatus suitable for use under actual field conditions for on-line separation of agricultural products as they are harvested.

SUMMARY OF THE INVENTION

There is thus provided in accordance with an embodiment of the invention apparatus for separation of products from spurious matter comprising:

a moving grid defining a support surface inclined with respect to a horizontal plane; and means for providing a flow of gas through said grid to reduce the friction between said products and said grid thereby to enable floating, sliding and/or rolling movement of said products along said support surface and into a collection receptacle.

In accordance with an embodiment of the invention said support surface is inclined upwardly with respect to the horizontal in the direction of grid travel. The separation generally occurs through a gravitational stratification process between heavier and lighter materials on the belt. The heavier materials move toward the belt and the lighter materials move above the heavier materials as all the materials are agitated by the airflow. Said floating, and/or sliding and/or rolling movement happens to the lighter material and occurs in a direction generally opposite to the direction of grid travel.

According to an alternative embodiment of the invention said support surface is inclined in a direction transverse to the direction of grid travel.

Further in accordance with a preferred embodiment of the invention the grid is an endless belt type grid driven by a motor and said airflow is supplied under and adjacent the return portion of the belt over its entire width and most of its length.

Further in accordance with a preferred embodiment of the invention the separation apparatus may be associated with or incorporated in a combine or other harvesting device for operation together therewith.

BRIEF DESCRIPTION OF THE INVENTION

Figure 2:
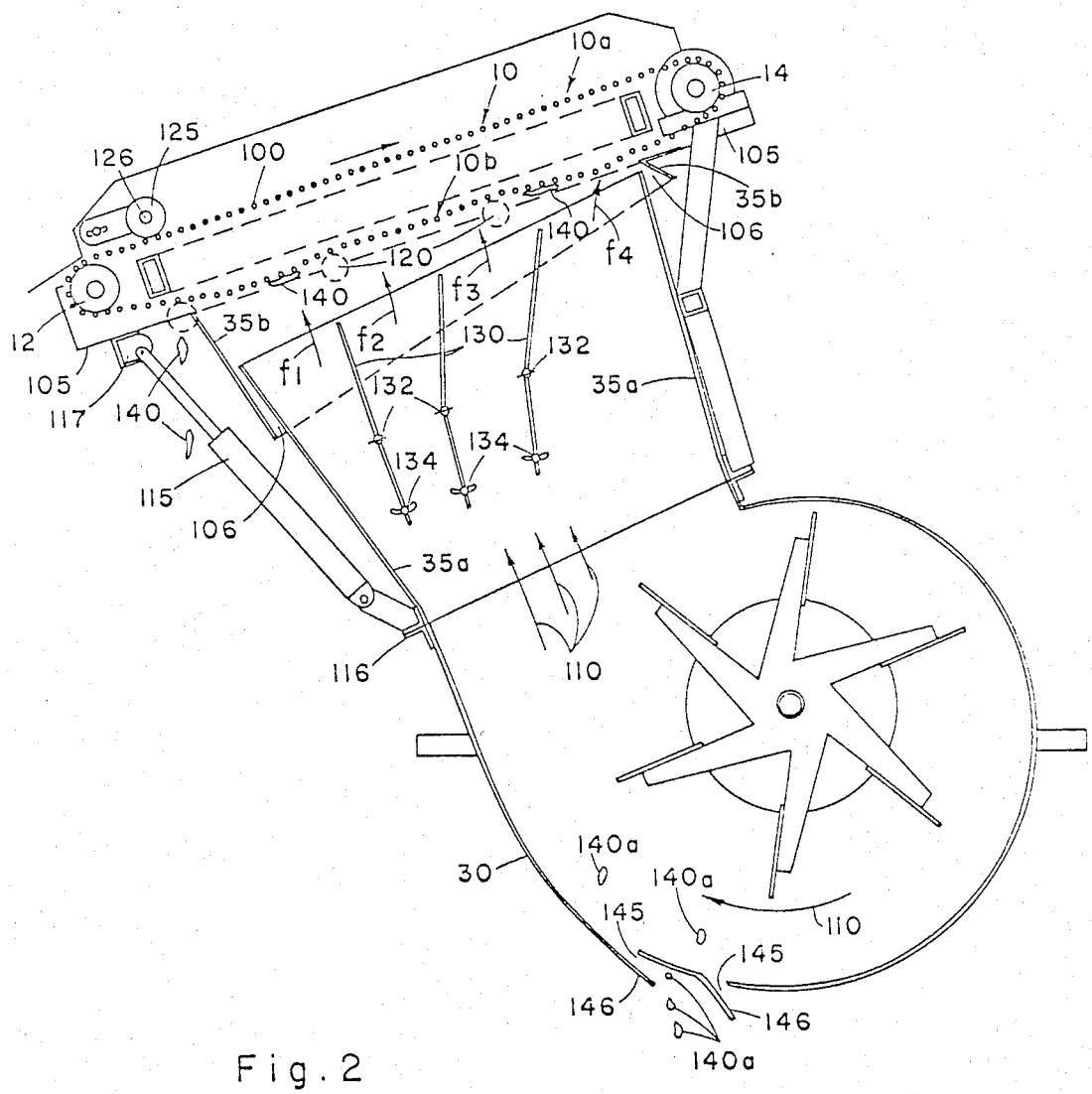

The present invention will be more clearly understood from the following detailed description taken in conjunction with the drawings in which:

FIG. 1 is a pictorial schematic illustration of separating apparatus constructed and operative in accordance with an embodiment of the invention, in association with harvesting machinery; and FIG. 2 is a cross-sectional view of another embodiment of the invention.

GENERAL DESCRIPTION

Referring now to FIG. 1 there is seen a moving grid 10 mounted on rollers 12 and 14, at least one of which is driven by a motor (not shown). Grid 10 is typically made of a metal or plastic screen material formed into an endless loop, the material being selected to have a relatively high proportion of open area. While a mesh arrangement is illustrated, it is to be understood that such surfaces as an apertured surface or a surface comprising parallel grating can also be used within the scope of the invention.

Grid 10 is arranged to lie in a plane which is inclined by an angle $\alpha$ with respect to a horizontal reference plane X—X and arranged such that the direction of inclination lies along the direction of forward travel of the grid during operation illustrated by arrow 20. The angle of inclination and the speed of the conveyor will vary depending on the products being separated.

The grid assembly comprising grid 10 and rollers 12 and 14 connected together by bridge 11 is adjustably mounted on a support frame 22 by means of a pivot mounting shaft 24 and associated attaching means 26 which enables the angular disposition of the grid with respect to frame 22 to be selectably fixed. In a preferred embodiment used for separating peanuts from clods the angle of inclination $\alpha$ is 14°–20° and the conveyor speed is 0.1–0.5 m/s.

According to an alternative embodiment of the invention grid surface 10 may also be inclined by an angle $\beta$ in a transverse direction perpendicular to the direction of grid movement indicated by arrow 20.

As a further alternative embodiment of the invention the device may be constructed with an angle $\alpha$ equal to zero and thus only transverse inclination.

An airflow is directed upwardly through grid 10 by a blower 30 containing therein a fan which is driven by an electric motor (not shown) coupled thereto by suitable coupling means (not shown) such as a drive belt. The force of the airflow is adjustable using movable plate 45, for example. The blower 30 may be driven via a power take-off from a common power source, for example the belt 29 driven by the tractor used to operate the agricultural machinery with which the separation apparatus is associated.

The outlet of blower 30 is coupled by a peripheral flexible coupling 35 which defines the flow of air through grid 10 and is fixably associated with the grid assembly. Provision of flexible coupling 35 enables the angular disposition of the grid to be adjusted relative to the blower disposition.

The raw material 40 including the products to be separated by use of the apparatus described herein is supplied from a location disposed above grid 10 through a hopper 42 which releases the material at a location along the grid surface where an upwardly directed airflow is present. The material is shown as received through a conveyor 51 from harvesting equipment shown generally as 52. Adjacent the extreme end of the grid surface in the direction of grid movement, there is disposed a waste receptacle or hopper 44 for the waste material, i.e. the clods that are not sufficiently lifted off the grid surface by the airflow to reduce the friction between the grid and the material or to float. At the opposite end of the grid, there is provided a product receptacle or hopper 46 for receiving the separated agricultural products, such as peanuts, for packaging, storing or further processing.

A gate 47 at the lower end of the conveyor is used to prevent clods from rolling down with the peanuts and to maintain a layer of material on the conveyor.

Unlike "stoners" the grid-like conveyor belt arrangement is self-cleaning. In the field especially the forced air is highly contaminated with vegetational debris which is blown into the outer surface of the belt as the belt passes the blower. Most of the debris falls out of the grid after the grid passes the blower, and during the time the outer surface faces down and while the belt passes roller 14. Debris left in the grid is effectively "backflushed" when the outer surface passes the blower at the top of the conveyor.

The operation of the apparatus described hereinabove will now be summarized. The products and spurious material to be separated from each other are supplied to the grid surface whereupon the forced air provided by the blower 30 agitates the mixed materials. The agitated materials become stratified with the heavier material juxtaposed to the conveyor surface. The lighter products rise slightly reducing the friction between the grid and the product and thereby enabling the products above the grid surface to float or slide or roll downwardly under the force of gravity along the slope of the grid surface to product receptacle 46.

It should be appreciated that the device also is useful for separating out products that will remain juxtaposed to the conveyor surface from spurious material that will float or roll or slide downwardly. Then the products are carried upwardly.

The speed of the airflow over the area across which it is applied and of the speed of rotation of grid 10 and the angular orientation of the grid are all selected so as to provide the optimal separation efficiency for each given product.

In one experimental run, 98% separation effectiveness was achieved for a mixture of 3.1% peanuts and 96.9% soil particles in the size range of 12 mm–20 mm under the following conditions:
  speed of grid—0.44 m. per second
  $\alpha$=angular disposition of grid with respect to horizontal plane—16°
  $\beta$=0
  air speed—10.2 meters/sec.
  total feed rate—10.7 ton/hour.

It is appreciated that various difficulties of prior art apparatus are overcome in the apparatus shown and described hereinabove. Since a driven grid is employed instead of a vibrating grid, the apparatus described herein is not subject to any significant vibrational forces which could interfere with the operation of associated machinery in the field.

The unit separates mixtures containing large percentage of clods (up to 99%) at a high feed rate that is impossible to use with vibration separators. Also the device is self-cleaning and therefore is not blocked by vegetation or other debris. The unit described is therefore ideally suited for field use including use with peanut salvage machines right on the fields.

It should be apparent from the foregoing that in the foregoing-described embodiment, the air, which is directed to the conveyor belt 10 from the fan in blower 30, through the coupling 35, which is bellow-shaped in FIG. 1, is not in an air-tight sealed chamber. The top part of the flexible coupling 35 is not air sealed to any structure in which the belt 10 moves. Rather, the belt 10 moves freely, including its lower or return portion, above the open end of the coupling 35, through which the air is directed to the belt's upper portion, on which the matter, to be separated, is loaded. That this is the case is apparent from the description and from FIG. 1. Therein the belt is not supported for movement as the top part of an air sealed chamber, below which air is supplied, as shown in British Patent No. 28,686/30, issued to Holmes. Therein, air chamber 1 is a sealed air chamber with a top part in the form of a conveyor, which is formed of chains and crossbars, designated therein by 8 and 9, respectively. Similarly, in Sutton's U.S. Pat. No. 2,404,414 an effectively sealed air chamber is shown. It is the entire chamber which vibrates to cause heavier matter to travel upwardly on its perforated top.

Such devices with air sealed chambers are not useful for field operations. Machines with sealed air chambers, to operate properly, must be uniformly loaded with matter on their active surfaces, be they of the moving or vibratory type. If the loading is not uniform the air tends to escape through those portions which are bedecked by less matter. Consequently, such loss of air prevents the proper stratification of the matter which is the main purpose of the machine. Those familiar with such machines are well aware of this fact.

Unlike the prior art, in the present invention, no sealed air pressure chamber is present. Rather the air, produced by the fan is directed by blower 30 through the coupling 35 upwardly to the conveyor belt 10 which freely rides above it. The lower or return portion of the moving belt 10 is juxtaposed but spaced from the top of the coupling 35. This is clear from the description since the return portion moves downwardly above the coupling. Even from FIG. 1 it is apparent that the front end of coupling 35 near upper roller 14 only extends near the roller, but does not enclose it. Thus, it is clear that the belt is not enclosed in a sealed air chamber.

The novel machine of the present invention, since it is not based on the principle of a closed air chamber does not require accurate, even distribution of matter, which is typically accomplishable only in plant conditions and not in field operation. Thus, the novel machine is particularly adapted for field use.

Under such conditions the air, which is sucked in by the fan, is far from clean. Typically, small leaves, pieces of straw and the like are sucked in by the fan into the blower with the air. Theoretically, this air may be filtered out from such contaminants, prior to entering the blower 30 by a filter, such as the one shown in U.S. Pat. No. 2,404,414. However, in field conditions, where the amount of contaminants is high, such filtering is impractical, since the filter would tend to clog up frequently, thus necessitating frequent stoppage of operation for filter cleaning. In the present invention even through the machine operates in the field and contaminated air is sucked into the blower without filtering, it does not affect the continuous operation of the machine. Herein as the air with the contaminants reaches the return portion of the belt, the air passes to the belt's upper or forward portion, on which the matter to be stratified is loaded. However, the contaminants are blocked from reaching the belt upper portion. The return portion, which carries the contaminants downwardly, as it passes by the coupling 35 on its downward travel and exits the air path, the contaminants tend to fall off the belt by gravity. Thus, the belt return portion acts as a continuous moving filter for the incoming air.

Attention is now directed to FIG. 2 which is a cross-sectional view of another embodiment of the invention with some significant improvements over those in the arrangement shown in FIG. 1. In FIG. 2, elements like those previously described are designated by like numerals. In FIG. 2 the moving grid or conveyor belt 10 is shown as consisting of rods 100, spaced sufficiently close to permit small particles of matter to be suspended thereon, yet far enough to allow air to pass therethrough. For explanatory purposes the portion of the belt 10, on which matter is loaded, may be referred to as the forward portion, since it moves forward to the highest point and is designated by 10a, while the lower portion, referred to as the return portion, is designated by 10b.

Unlike the bellow-type coupling 35 of FIG. 1, in the FIG. 2 embodiment the coupling to blower 30 consists of a stationary funnel-type portion, hereafter referred to as the stationary coupling portion 35a. Extending from structural members 105 is a skirt-like coupling portion 35b. It surrounds the top of the stationary coupling portion 35a but is clearly spaced therefrom as indicated by 106. It should thus be apparent that the air from the blower 30 and which is designated by arrows 110, passes through a two-part coupling which is not an air sealed chamber.

The structure 105 is pivotably coupled to 35a about the shaft on which roller 14 is mounted. A hydraulic piston 115 is connected at 116 to the stationary coupling portion 35a and at the other end at 117 to structure 105. It is used to raise or lower the structure 105 near the low end and thus control the angle of inclination of the belt 10. This piston effectively serves the function of element 26, previously described. However in addition it raises or lowers skirt-like coupling portion 35b about the stationary portion 35a without touching it, so as to insure that coupling portions 35a and 35b overlap while being spaced apart from one another.

If desired, when using a belt of rods 100 in order to prevent any sagging a plurality of idlers 120 may be used to prevent the return portion 10b from sagging. It has been discovered that as to the barrier gate, previously described in connection with gate 47, it is preferable to provide a rolling, rather than a stationary gate. Such a gate is shown in FIG. 2. It is effectively a cylinder 125 pivotally mounted on a pivot 126 for rotation along its axis, which is perpendicular to the belt's direction of travel.

The advantages of a rolling gate over a nonstationary one will now be discussed. In operation, under field conditions it is unavoidable for some relatively heavy pieces of contaminating matter, e.g. pieces of straw and the like from being loaded onto the belt together with the matter for stratification, such as clods and peanuts to be separated. These contaminants would tend to slide down toward the gate and thus fill up the space between the moving belt and the gate. If the gate were stationary they would tend to pile up near the gate and gradually occupy more and more of the belt's forward portion 10a and therefore reduce the efficiency of the operation. However, by providing a rolling gate such as gate 125, as such contaminants slide down toward the rolling gate, they provide a friction force between the gate and the moving belt. Consequently, the gate rotates, e.g. CCW for an upward travel of the belt, and as it turns it carries with it, and thus removes, elevating and discharging the contaminants from off the belt's forward portion 10a. Thus a rollable gate, rotatable as a result of frictional engagement between it and the moving belt is clearly advantageous. If desired the roller 25 may be adjusted to be in contact with the belt. Thus the roller rotates as long as the belt moves.

It is appreciated by those familiar with the art that when air is directed to the belt from an adjacently located blower, rather than from a sealed air pressure chamber, such as those shown in the art referred to, the air flow along the belt is not uniform. In order to provide uniform airflow along the belt, baffles 130 are provided and are supported by coupling part 35a. These baffles are located in the air flow path so as to cause the air to reach the belt with the desired flow distribution. If desired, the baffles or part of them can be pivotably supported at 132 and locked at 134, to adjust their positions as required.

In attempting to optimize the stratification operation it has been discovered that it is preferred to regulate the air flow through the belt forward portion 10a, on which matter to be stratified is loaded, to be other than uniform. As to the air flow near the gate, it is desirable to have a relatively low air flow, in order not to impede the upward travel of heavier particles. As to the air flow near the top of the belt forward portion, e.g. close to roller 14, thereat greater airflow is desired to prevent lighter particles of matter, e.g. peanuts, from being carried over the top roller 14 and into a container, such as hopper 44 together with the heavier particles, e.g. clods. Such air flow distribution is attainable with the present invention by fixing and/or adjusting the orientations of the baffles. In FIG. 2. $f_1$ through $f_4$ designate sections of different air flow rates along the belt with the sections with the higher subscripts designating higher flow rates.

As previously described the belt return portion 10b acts as a filter which prevents contaminants, e.g. leaves, straw, etc., which get sucked in by the fan with the field air from reaching the forward portion 10a, and thus block the flow of air thereto. Such contaminants are designated in FIG. 2 by 140. As long as the belt 10 moves, the return portion 10b carries these contaminants out of the air path prior to the belt reaching and rolling over roller 12 to become part of the belt forward portion 10a, these contaminants are no longer pressed by the air against the belt. Thus, they fall off by gravity to the ground, as shown. However, there may be cases in which these contaminants 140 do not exit the coupling 35. For example, whenever the machine is stopped so that the belt as well as the fan stop, which happens frequently in field use, any contaminants 140 which previously were pushed against the return portion 10b by the air 110 are no longer pressed against the belt. Thus, they tend to fall down due to gravity, through coupling 35 into blower 30. Also, very small but heavy particles, e.g. small stones and clods, loaded onto the forward portion 10a together with the matter to be stratified may fall through the spaces between the rollers 110 and fall to the bottom of the blower 30. To prevent the latter from becoming clogged, which would require repeated cleaning and thus interrupt the operation of the machine which is most undesirable, in accordance with the invention the blower 30 is provided with one or more openings 145 with downward extending lips 146 at its bottom end. It should be clear that these openings are shaped to minimize any effect on the air flow, produced by the fan. However, as to any air contaminants, which are designated by 140a, which may fall down due to gravity once the machine is stopped or pass through the belt, they would exit the blower through the openings 145. Thus, the machine need not be stopped, to empty out the blower 30 due to accumulation of contaminants which are sucked into it by the fan with the field air and which are not carried out by the belt return portion, when the latter moves downwardly beyond the opening of the coupling 35.

Although particular embodiments of the invention have been described and illustrated herein, it is recognized that modifications and variations may readily occur to those skilled in the art and consequently, it is intended that the claims be interpreted to cover such modifications and equivalents.

What we claim is:

1. An apparatus for use in an agricultural field for at least separating particles of one agricultural product having a first specific density from particles of matter having a different specific density, comprising:
    moveable endless conveyor means inclinable with respect to a horizontal plane from a lower to an upper end and defining an upper forward portion which is moveable upwardly and a lower return portion which is moveable downwardly,
    gate means juxtaposed said forward portion near the lower end thereof and extending a direction perpendicular to the direction of travel of said forward portion;
    an air directing housing means below said conveyor means defining an opening of adjustable dimensions including air suction means for sucking into said housing means through said opening field air with any contaminants therein and for directing said contaminated air toward the conveyor means through a top opening of housing means, whereby the air passes through the return portion to the forward portion of said conveyor means to cause said particles thereon to be stratified with the particles of higher specific density being closest to said forward portion and travelling upwardly with it toward the upper end and the particles of lower density being stratified above the heavier particles and sliding downwardly toward said gate means, while contaminants in the air are blocked by said return portion from passing to said forward portion and are carried downwardly beyond the top opening of said housing means.

2. An apparatus as recited in claim 1 wherein said housing means comprises a stationary portion in which said air suction means in the form of a rotatable fan is located adjacent the bottom thereof and said top opening is formed in said stationary portion remotely from the bottom thereof whereby said top opening is exposed to said return portion to direct the air thereto.

3. An apparatus as recited in claim 1 further including adjustable baffle means coupled to said housing means near the top opening thereof for distributing the air, flowing to said conveyor means, to have a preselected air flow distribution from a lower point adjacent said gate means to the upper point of said conveyor means.

4. An apparatus as recited in claim 3 wherein said baffle means are adjustable to provide an air flow distribution out of said top openiong which increases from the lower end to the top end.

5. An apparatus as recited in claim 1 wherein said housing means define a plurality of openings for facilitating contaminants which are not removed by said return portion of the moving conveyor means and which fall to the bottom of the housing means to exit the bottom through said openings.

6. An apparatus as recited in claim 1 wherein said gate means comprises a cylinder adjacent the lower end of said forward portion of said conveyor means, and support means for supporting said cylinder for rotation above said forward portion.

7. An apparatus as recited in claim 1 wherein said apparatus further includes structural means for supporting said moveable conveyor means, a first support element for pivotably interconnecting one end of said structural means to said housing means and a second support element of adjustable length for interconnecting an opposite end of said structural means to said housing to control the angle of inclination of said conveyor means as a function of its length said structural means defining an opening on the bottom side thereof to expose substantially the entire length of said return portion to the spaced apart top opening of said housing means, said housing means further including a skirt-like member extending downwardly from said structural member and effectively surrounding the top opening with a space therebetween.

8. An apparatus as recited in claim 7 wherein said housing means comprises a stationary portion in which said air suction means in the form of a rotatable fan is located adjacent the bottom thereof and said top opening is formed in said stationary portion remotely from the bottom thereof whereby said top opening is exposed to said return portion to direct the air thereto.

9. An apparatus as recited in claim 7 further including adjustable baffle means coupled to said housing means near the top opening thereof for distributing the air, flowing to said conveyor means, to have a preselected air flow distribution from a lower point adjacent said gate means to the upper point of said conveyor means.

10. An apparatus as recited in claim 9 wherein said baffle means are adjustable to provide an air flow distribution out of said top opening which increases from the lower end to the top end.

11. An apparatus as recited in claim 7 wherein said housing means define a plurality of openings for facilitating contaminants which are not removed by and return portion of the moving conveyor means and which fall to the bottom of the housing means to exit the bottom through said openings.

12. An apparatus for use in an agricultural field for separating at least particles of one agricultural product having a first specific density from particles of matter having a different specific density, comprising:
moveable endless conveyor means inclinable with respect to a horizontal plane and defining an upper forward portion of a selected length which moves upwardly and on which the particles to be separated are loaded and an equal length lower return portion which is moveable downwardly; and
air directing means located below said lower return portion and having an opening spaced apart from said lower return portion for directing air to the upper forward portion through said lower return portion, the dimension of said opening through which air flows to said lower return portion being less than the length dimension of said lower return portion, whereby contaminants in said air which are pushed by the air against said lower return portion are carried by said lower return portion as it travels downwardly beyond said opening.

13. An apparatus as recited in claim 12 wherein said air directing means includes a housing with an air inlet opening, and suction means for sucking field air into said housing and for directing it to said opening, with contaminants in said air which are pushed against said lower return portion being carried beyond said opening and fall to the ground by gravity when no longer exposed to the air directed to said lower return portion, through said housing.

14. An apparatus as recited in claim 13 wherein said housing means define a plurality of openings for facilitating contaminants which are not removed by said return portion of the moving conveyor means and which fall to the bottom of the housing means to exit the bottom through said openings.

15. An apparatus as recited in claim 13 further including adjustable baffle means coupled to said housing means near the top opening thereof for distributing the air, flowing to said conveyor means, to have a preselected air flow distribution from a lower point adjacent said gate means to the upper point of said conveyor means.

16. An apparatus as recited in claim 13 wherein said housing means define a plurality of openings for facilitating contaminants which are not removed by said return portion of the moving conveyor means and which fall to the bottom of the housing means to exit the bottom through said openings.

17. An apparatus as recited in claim 13 further including a gate means comprising a cylinder adjacent a lower end of said forward portion of said conveyor means, and support means for supporting said cylinder for rotation above said forward portion.

* * * * *